(12) United States Patent
Singh et al.

(10) Patent No.: US 9,904,480 B1
(45) Date of Patent: Feb. 27, 2018

(54) MULTIPLEXING STREAMS WITHOUT CHANGING THE NUMBER OF STREAMS OF A DEDUPLICATING STORAGE SYSTEM

(71) Applicant: EMC Corporation, Hopkinton, MA (US)

(72) Inventors: Pranay Singh, Cupertino, CA (US); Sai Chivukula, Fremont, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 428 days.

(21) Appl. No.: 14/575,079

(22) Filed: Dec. 18, 2014

(51) Int. Cl.
*G06F 3/06* (2006.01)
*G06F 17/30* (2006.01)

(52) U.S. Cl.
CPC .......... *G06F 3/0619* (2013.01); *G06F 3/0641* (2013.01); *G06F 3/0673* (2013.01); *G06F 17/30088* (2013.01)

(58) Field of Classification Search
CPC ..... G06F 3/0619; G06F 3/0641; G06F 3/0673
See application file for complete search history.

(56) References Cited

U.S. PATENT DOCUMENTS

| | | | |
|---|---|---|---|
| 8,533,410 B1 * | 9/2013 | Corbett | G06F 12/00 707/637 |
| 2003/0097523 A1 * | 5/2003 | Nobuyoshi | G06F 3/0601 711/112 |
| 2011/0087851 A1 * | 4/2011 | Retnamma | G06F 11/1464 711/162 |
| 2014/0380007 A1 * | 12/2014 | Suen | G06F 3/0604 711/162 |

OTHER PUBLICATIONS

EMC Technical Notes, NetWorker 7.6.3 and later Improved Deduplication with Multiplexing to Data Domain VTLs, Technical Note, P/N 300-013-767, Rev A02, Feb. 2012.*

* cited by examiner

*Primary Examiner* — Brian Peugh
*Assistant Examiner* — Edmund Kwong
(74) *Attorney, Agent, or Firm* — Womble Bond Dickinson (US) LLP

(57) ABSTRACT

In one embodiment, a method includes creating a first number of streams for a file system manager of a deduplicating storage system to access concurrently a type of data blocks, where each stream is for one file system and is identified by a stream identifier. The method further includes mapping stream identifiers to each of the type of data blocks passing through the first number of streams. The method further includes accessing the type of data blocks in storage units of the deduplicating storage system through a second number of streams, where the second number of streams are dedicated to the type of data blocks in the deduplicating storage system, where the second number is smaller than the first number, where the data blocks are tracked according to the mapped stream identifiers, and where the data blocks are stored in the storage units after a deduplication process to remove duplication.

18 Claims, 10 Drawing Sheets

Block Map
352

| Data Block ID | File System Namespace ID | Page Type |
|---|---|---|
| 100 | 1 | Summary Page |
| 101 | 1 | Root Page |
| 102 | 1 | Internal Page |
| 103 | 1 | Leaf Page |
| 104 | 2 | Summary Page |
| 105 | 2 | Root Page |
| 106 | 2 | Internal Page |
| 107 | 2 | Leaf Page |
| 108 | 3 | Summary Page |
| 109 | 3 | Root Page |
| 110 | 3 | Internal Page |
| 111 | 1 | Leaf Page |
| 112 | 1 | Leaf Page |
| 113 | 1 | Leaf Page |

FIG. 5

MULTIPLEXING STREAMS WITHOUT CHANGING THE NUMBER OF STREAMS OF A DEDUPLICATING STORAGE SYSTEM

FIELD OF THE INVENTION

Embodiments of the present invention relate generally to storage systems. More particularly, embodiments of the invention relate to increasing stream capability without changing the number of streams of a deduplicating storage system.

BACKGROUND

Data storage is a critical component for computing. In a computing device, there is a storage area in the system to store data for access by the operating system and applications. In a distributed environment, additional data storage may be a separate device that the computing device has access to for regular operations. These data storages are generally referred to storage systems. For years, the dominant storage medium for storage systems was tape because of its low cost, yet it is losing ground to disks, which are used typically in deduplicating storage systems. Deduplication in storage systems in can deliver an order of magnitude greater data reduction than traditional compression over time, and it results in few disks thus lower cost than comparable tape based storage systems.

In a deduplicating storage system, accessing to disks is often through allocated streams. Each stream is associated with a set of resources dedicated to the stream, thus such deduplicating storage system can only support a limited number of streams that are often predetermined.

BRIEF DESCRIPTION OF THE DRAWINGS

Embodiments of the invention are illustrated by way of example and not limitation in the figures of the accompanying drawings in which like references indicate similar elements.

FIG. 5 illustrates an implementation of block map for file system namespace according to one embodiment of the invention.

FIG. 7A illustrates a snapshot map and corresponding data blocks.

FIG. 7B illustrates updating a snapshot record according to one embodiment of the invention.

DETAILED DESCRIPTION

Figure 1:
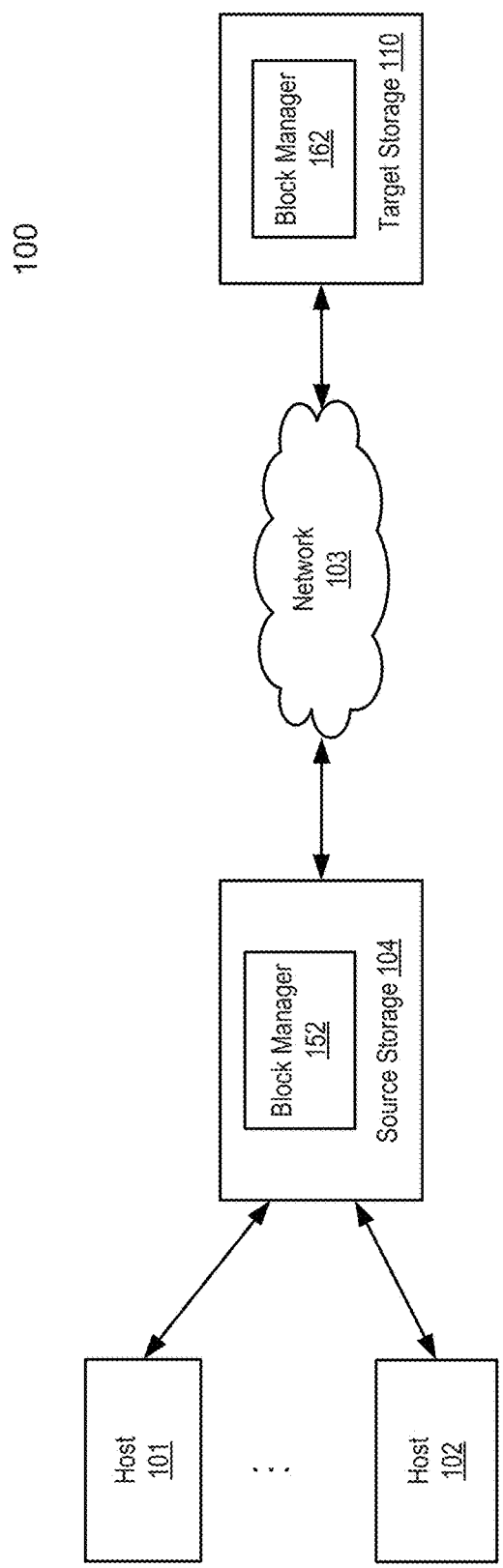
FIG. 1 is a block diagram illustrating a system in which stream multiplexing is performed according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

A computer-implemented method is disclosed. The method includes creating a first number of streams for a file system manager of a deduplicating storage system to access concurrently a type of data blocks, where each stream is for one file system and is identified by a stream identifier. The method further includes mapping stream identifiers to each of the type of data blocks passing through the first number of streams, where each data block is mapped to one stream identifier of one of the first number of streams that the data block passes through. The method further includes accessing the type of data blocks in storage units of the deduplicating storage system through a second number of streams, where the second number of streams are dedicated to the type of data blocks in the deduplicating storage system, where the second number is smaller than the first number, where the data blocks are tracked according to the mapped stream identifiers, and where the data blocks are stored in the storage units after a deduplication process to remove duplication.

A deduplicating storage system is disclosed. The deduplicating storage system creates a first number of streams for a file system manager of the deduplicating storage system to access concurrently a type of data blocks, where each stream is for one file system and is identified by a stream identifier. The deduplicating storage system maps stream identifiers to each of the type of data blocks passing through the first number of streams, where each data block is mapped to one stream identifier of one of the first number of streams that the data block passes through. The deduplicating storage system further accesses the type of data blocks in storage units of the deduplicating storage system through a second number of streams, where the second number of streams are dedicated to the type of data blocks in the deduplicating storage system, where the second number is smaller than the first number, where the data blocks are tracked according to the mapped stream identifiers, and where the data blocks are stored in the storage units after a deduplication process to remove duplication.

A non-transitory computer-readable storage medium is disclosed. The non-transitory computer-readable storage medium has instructions stored therein, which when executed by a processor, cause the processor to perform operations. The operations include creating a first number of streams for a file system manager of a deduplicating storage system to access concurrently a type of data blocks, where each stream is for one file system and is identified by a stream identifier. The operations further include mapping stream identifiers to each of the type of data blocks passing through the first number of streams, where each data block is mapped to one stream identifier of one of the first number of streams that the data block passes through. The operations further include accessing the type of data blocks in storage units of the deduplicating storage system through a second number of streams, where the second number of streams are dedicated to the type of data blocks in the deduplicating storage system, where the second number is smaller than the first number, where the data blocks are tracked according to the mapped stream identifiers, and where the data blocks are stored in the storage units after a deduplication process to remove duplication.

Architecture of a Deduplicating Storage System

FIG. 1 is a block diagram illustrating a system in which stream multiplexing is performed according to one embodiment of the invention. Referring to FIG. 1, system 100 includes, but is not limited to, one or more hosts 101-102 communicatively coupled to source storage system 104 and target storage system 110 over network 103. Hosts 101-102 may be any type of hosts such as a server, a personal computer (e.g., desktops, laptops, and tablets), a "thin" client, a personal digital assistant (PDA), a Web enabled system, a gaming device, a media player, or a mobile phone (e.g., Smartphone), etc. Network 103 may be any type of network such as a local area network (LAN), a wide area network (WAN) such as Internet, a corporate intranet, a metropolitan area network (MAN), a storage area network (SAN), a bus, or a combination thereof, wired and/or wireless.

Both source storage system 104 and target storage system 110 may represent any type of server or cluster of servers. For example, source storage system 104 and target storage system 110 may be a storage server used for any of various different purposes, such as to provide multiple users with access to shared data and/or to back up mission critical data. Source storage system 104 and target storage system 110 may be, for example, a file server (e.g., an appliance used to provide NAS capability), a block-based storage server (e.g., used to provide SAN capability), a unified storage device (e.g., one which combines NAS and SAN capabilities), a nearline storage device, a direct attached storage (DAS) device, a tape backup device, or essentially any other type of data storage device. Source storage system 104 and target storage system 110 may have a distributed architecture, or all of its components may be integrated into a single unit. Note source storage system 104 and target storage system 110 may have different replication/restoration performance characteristics even when they have similar architecture. Source storage system 104 is implemented as part of an archive and/or backup storage system such as a deduplicating storage system available from EMC® Corporation of Hopkinton, Mass. Target storage system 110 may also be implemented as a deduplicated storage system in some embodiments.

Source storages 104 and target storage 110 contain block managers 152 and 162 respectively. Each block managers is configured to perform stream multiplexing at the respective storage system. The block managers disclosed in embodiments of the invention can be applied to storage systems such as a source storage system, a target storage system, or a backup storage system, where each storage system is physically separated from one another, and each storage system implementing the block managers is a deduplicating storage system.

Figure 2:
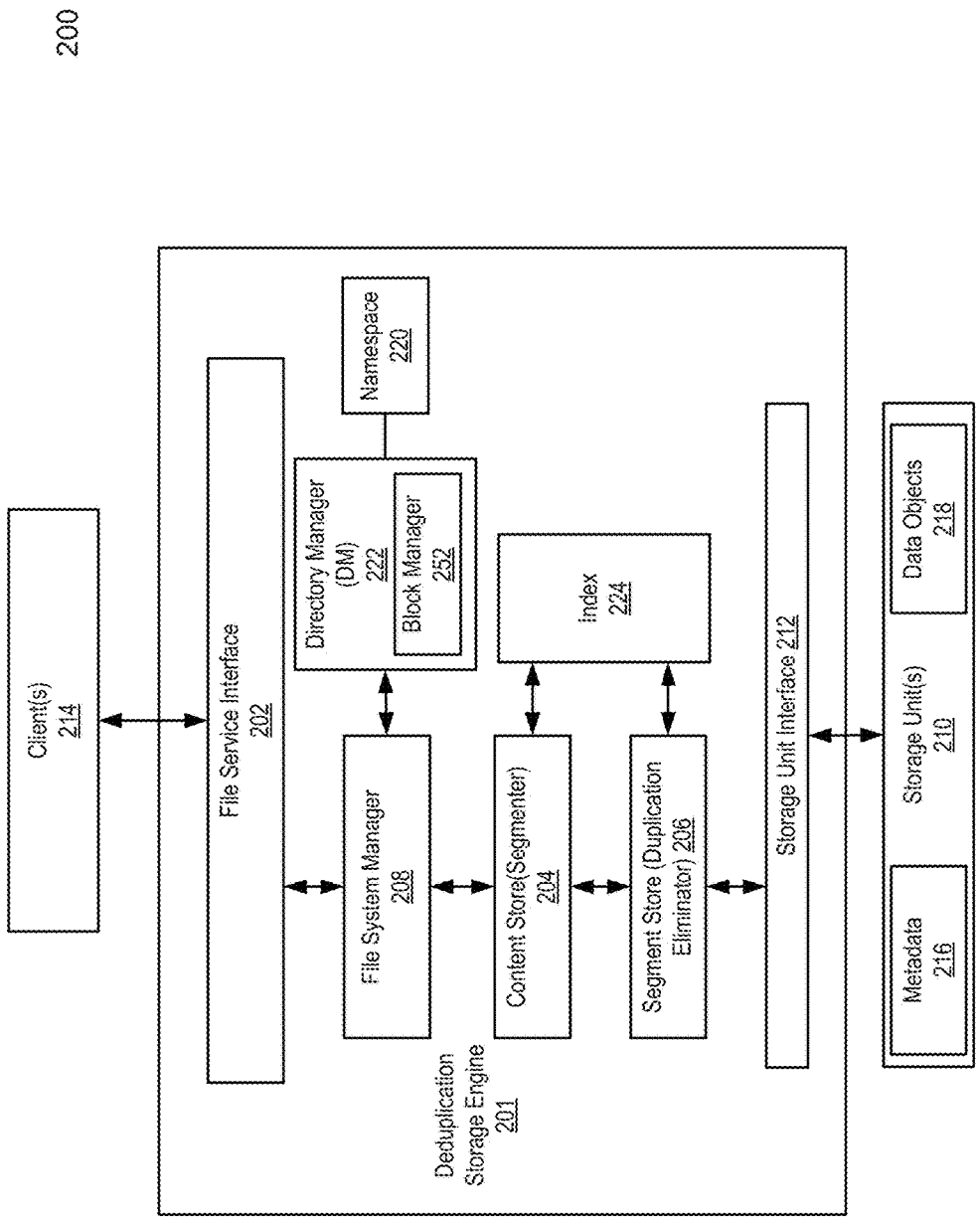
FIG. 2 is a block diagram illustrating a deduplicating storage system according to one embodiment of the invention.

FIG. 2 is a block diagram illustrating a deduplicating storage system according to one embodiment of the invention. The deduplicating storage system 200 may be a detail implementation of deduplicating source storage system 104 or target storage system 110 illustrated in FIG. 1.

The deduplicating source storage system 200 interfaces one or more clients 214 with one or more storage units 210 storing metadata 216 and data objects 218. Clients 214 may be any kinds of clients, such as, for example, a client application (e.g., from hosts 101/102 of FIG. 1), backup software, or a garbage collector, located locally or remotely over a network. A network may be any type of networks such as a local area network (LAN), a wide area network (WAN) such as the Internet, a corporate intranet, a metropolitan area network (MAN), a storage area network (SAN), a bus, or a combination thereof, wired and/or wireless.

Storage units (sometimes referred to as storage devices) 210 may be implemented locally (e.g., single node operating environment) or remotely (e.g., multi-node operating environment) via an interconnect, which may be a bus and/or a network (e.g., a storage network). In one embodiment, one of storage units 210 operates as an active storage to receive and store external or fresh user data from a client (e.g., an end-user client or a primary storage system associated with one or more end-user clients), while the another one of storage units 210 operates as a target storage unit to periodically archive data from the active storage unit according to an archiving policy or scheme. Storage units 210 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 210 may also be combinations of such devices. In the case of disk storage media, the storage units 210 may be organized into one or more volumes of redundant array of inexpensive disks (RAID). Data stored in the storage units may be stored in a compressed form (e.g., lossless compression: HUFFMAN coding, LEMPEL-ZIV WELCH coding; delta encoding: a reference to a chunk plus a difference; etc.). In one embodiment, different storage units may use different compression methods (e.g., main or active storage unit from other storage units, one storage unit from another storage unit, etc.).

The metadata, such as metadata 216, may be stored in at least some of storage units 210, such that files can be accessed independent of another storage unit. Metadata of each storage unit includes enough information to provide access to the files it contains. In one embodiment, metadata may include fingerprints contained within data objects 218, where a data object represents containers, which contains one or more compression regions (CRs) of one or more data chunks, CRs, or data chunks. Each data chunk is a fragment of data block and data chunks are processed and stored in the deduplicated storage system. Fingerprints are mapped to a particular data object via metadata 216, enabling the system to identify the location of the data object containing a data chunk represented by a particular fingerprint. A fingerprint may be generated based on at least a portion of a data chunk, for example, by applying a predetermined mathematical algorithm (e.g., hash function) to at least a portion of the content of the data chunk. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, metadata 216 may include a file name, a storage unit identifier (ID) identifying a storage unit in which the chunks associated with the file name are stored, reconstruction information for the file using the chunks, and any other appropriate metadata information. Metadata 216 may further include a chunk ID, a chunk sketch, a hash of a chunk, an encrypted hash of a chunk, random data, or any other appropriate metadata. In some embodiments, metadata associated with a chunk is used to identify identical and/or similar data segments. The stored metadata enables a faster identification of identical and/or similar data chunks as an ID and/or sketch (e.g., a set of values characterizing the chunk) do not need to be recomputed for the evaluation of a given incoming data segment.

In one embodiment, a chunk ID includes one or more deterministic functions of a data chunk, one or more hash functions of a data chunk, random data, or any other appropriate data chunk ID. In various embodiments, a data chunk sketch includes one or more deterministic functions of a data chunk, one or more hash functions of a data chunk, one or more functions that return the same or similar value for the same or similar data chunks (e.g., a function that probably or likely returns a same value for a similar data segment), or any other appropriate data segment sketch. In various embodiments, sketch function values are determined to be similar using one or more of the following methods: numeric difference, hamming difference, locality-sensitive hashing, nearest-neighbor-search, other statistical methods, or any other appropriate methods of determining similarity. In one embodiment, sketch data includes one or more data patterns characterizing a chunk. For example, a sketch may be generated by applying one or more functions (e.g., hash functions) on a chunk and a subset of the results of the functions performed on the chunk (e.g., a number of results, for example the ten lowest results or the ten highest results) are selected as a sketch.

In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for chunks in storage units, identifying specific data objects).

In one embodiment, deduplication storage engine 201 includes file service interface 202, file system manager 208, content store 204, segment store 206, directory manager 222, namespace 220, index 224, and storage unit interface 212. Deduplication storage engine 201 receives a file or files (or data item(s)) via file service interface 202, which may be part of a file system namespace 220 of a file system associated with the deduplication storage engine 201. The file system namespace 220 is managed by directory manager 222, which contains block manager 252 explained in more details herein below. File service interface 202 supports a variety of protocols, including a network file system (NFS), a common Internet file system (CIFS), and a virtual tape library interface (VTL), etc.

The file(s) is/are processed by content store 204 and file system manager 208. Content store 204, also referred to as a segmenter, breaks the file(s) into variable-length chunks based on a variety of rules or considerations. For example, the file(s) may be broken into chunks by identifying chunk boundaries. Chunk boundaries may be determined using file boundaries, directory boundaries, byte counts, content-based boundaries (e.g., when a hash of data in a window is equal to a value), or any other appropriate method of determining a boundary. Reconstruction of a data block, data stream, file, or directory includes using one or more references to the one or more chunks that originally made up a data block, data stream, file, or directory that was/were previously stored.

In some embodiments, chunks are segmented by identifying chunk boundaries that are content-based—for example, a hash function is applied to values of data within a sliding window through the data stream or block and when the hash function is equal to a value (or equal to one of several values) then a chunk boundary is identified. In various embodiments, chunk boundaries are identified using content based functions operating on windows within a data stream or block that have a minimum or maximum or other value or any other appropriate content based chunking algorithm. In various embodiments, chunks include fixed-length chunks, variable length chunks, overlapping chunks, non-overlapping chunks, chunks with a minimum size, chunks with a maximum size, or any other appropriate chunks. In various embodiments, chunks include files, groups of files, directories, a portion of a file, a portion of a data stream with one or more boundaries unrelated to file and/or directory boundaries, or any other appropriate chunk.

In one embodiment, file system manager 208, also referred to as a file system control module, processes information to indicate the chunk(s) association with a file. In some embodiments, a list of fingerprints is used to indicate chunk(s) associated with a file. File system manager 208 passes chunk association information (e.g., representative data such as a fingerprint) to index 224. Index 224 is used to locate stored chunks in storage units 210 via storage unit interface 212. Segment store 206, also referred to as a duplication eliminator, identifies whether a newly received chunk has already been stored in storage units 210. In the event that a chunk has already been stored in storage unit(s), a reference to the previously stored chunk is stored, for example, in a segment tree associated with the file, instead of storing the newly received chunk. A segment tree of a file may include one or more nodes and each node represents or references one of the deduplicated chunks stored in storage units 210 that make up the file. Chunks are then packed by a container manager (which may be implemented as part of storage unit interface 212) into one or more storage containers stored in storage units 210. The deduplicated chunks may be further compressed into one or more CRs using a variation of compression algorithms, such as a Lempel-Ziv algorithm before being stored. A container may contain one or more CRs and each CR may contain one or more deduplicated chunks (also referred to deduplicated segments). A container may further contain the metadata such as fingerprints, sketches, type of the data chunks, etc. that are associated with the data chunks stored therein.

When a file is to be retrieved, file service interface 202 is configured to communicate with file system manager 208 to identify appropriate chunks stored in storage units 210 via storage unit interface 212. Storage unit interface 212 may be implemented as part of a container manager. File system manager 208 communicates (e.g., via content store 204) with index 224 to locate appropriate chunks stored in storage units via storage unit interface 212. Appropriate chunks are retrieved from the associated containers via the container manager and are used to construct the requested file. The file is provided via file service interface 202 in response to the request. In one embodiment, file system manager 208 utilizes a segment tree (e.g., a segment/segment tree obtained from namespace 220) of content-based identifiers (e.g., fingerprints) to associate a file with data segments/chunks and their locations in storage unit(s). In the event that a chunk associated with a given file or file changes, the content-based identifiers will change and the changes will ripple from the bottom to the top of the tree associated with the file efficiently since the appropriate content-based identifiers are easily identified using the tree structure. Note that some or all of the components as shown as part of deduplication engine 201 may be implemented in software (e.g., executable code executed in a memory by a processor), hardware (e.g., processor(s)), or a combination thereof. For example, deduplication engine 201 may be implemented in a form of executable instructions that can be stored in a non-transitory machine-readable storage medium, where the instructions can be executed in a memory by a processor.

In one embodiment, deduplicating storage system 200 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

Accessing Storage Units Through Streams

Figure 3A:
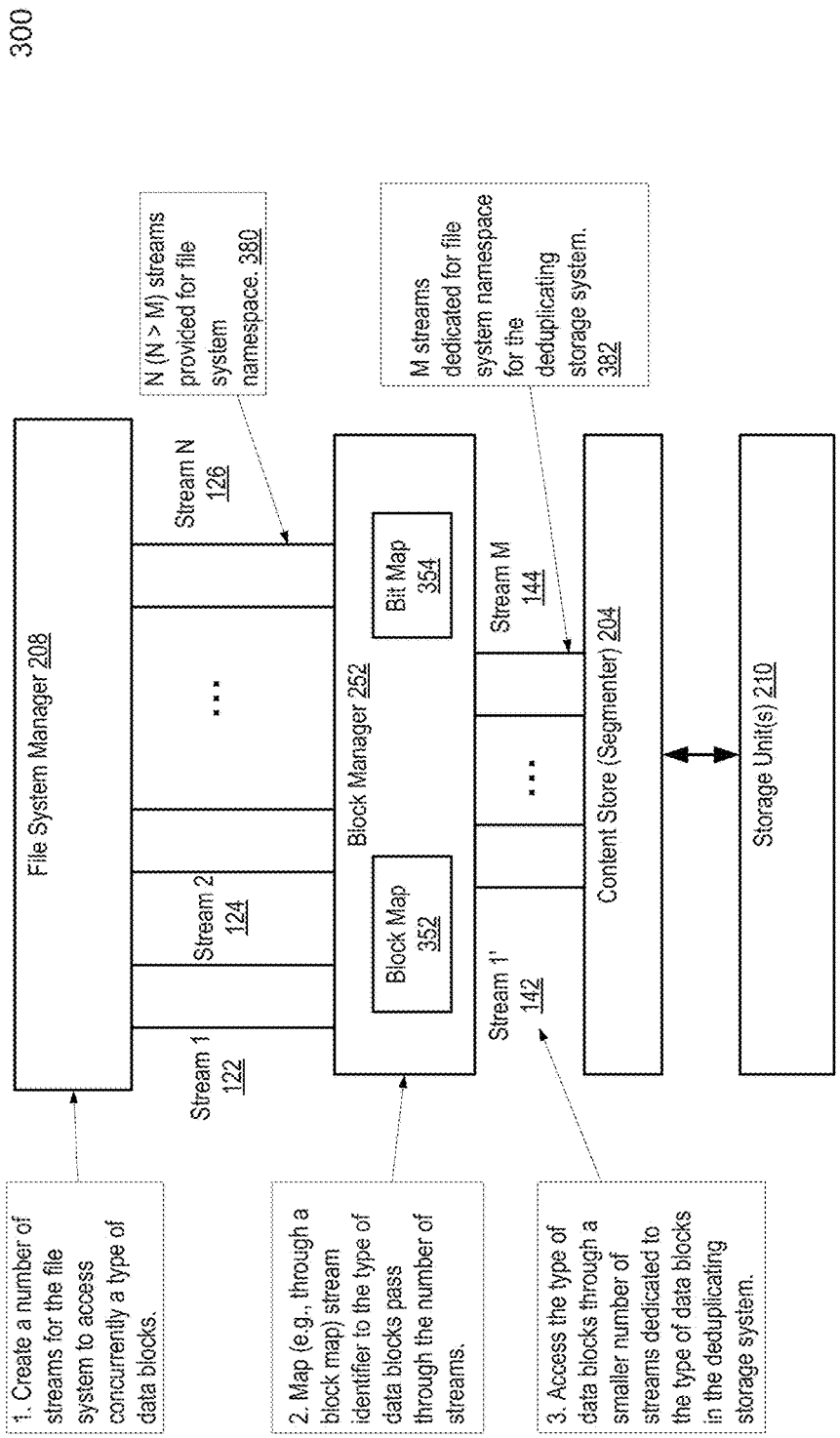
FIG. 3A is a block diagram illustrating storage unit access of a deduplicating storage system according to one embodiment of the invention.

FIG. 3A is a block diagram illustrating storage unit access of a deduplicating storage system according to one embodiment of the invention. The deduplicating storage system 300 is an implementation of the duplicating storage system 200 in FIG. 2, and the same or similar references indicate elements or components having the same or similar functionalities. Certain blocks are omitted for clarity of discussion. Each data block in the storage units may store either user data or file system namespace data. While the embodiments of the invention are described primarily in reference to file system namespace data, the embodiments of the invention are equally applicable to user data of file systems.

The access of the storage unit is initiated by file system manager 208, which interacts with file service interface 202 of the deduplicating storage system discussed herein above. File system manager 208 takes requests to access (e.g., read from or write to) the storage units 210 from the variety of file systems through the file service interface and relays the requests. The requests may be for either user data or file system namespace data.

In a storage system, a file system namespace indicates the way files and directories are identified and organized in the storage system. The file system namespace may take any of a variety of different forms. In one embodiment it contains file names, directory names, and the attributes and hierarchy of the files and directories.

A file system namespace is associated with a file system, and data associated with the same file system namespace is preferably stored close to each other for ease access in a deduplicating storage system. The spatial locality of file system namespace may be achieved through a dedicated stream to access the storage units for one file system namespace. Similarly, for user data of a file system, spatial locality in the storage units is desirable. Thus, a deduplicating storage system may often offer dedicated streams for user data and file system namespace data respectively. For example, the Stream-Informed Segment Layout (SISL) architecture is used to access data blocks in a deduplicating storage system available from EMC® Corporation of Hopkinton, Mass.

For each dedicated stream for accessing data blocks, a set of resources are allocated. For example, non-volatile random-access memory (NVRAM) is allocated for each stream to store data blocks so that if the deduplicating storage system is crashed in the middle of data access, the data blocks may be recovered. With the limited resources in the deduplicating storage system, the number of supported streams is also limited. For example, in a large system implemented in the SISL architecture, the dedicated streams for the file system namespace is no more than 64. The number of streams is often insufficient when the deduplicating system support a large number of file systems, and hundreds of streams for the file system namespaces are preferable.

Task boxes 1-3 illustrate a data access process through multiplexing a set of dedicated streams according to one embodiment of the invention. At task box 1, file system manager 208 creates a number of streams for the file system to access concurrently a type of data blocks. The type of data blocks can be data blocks for user data of a file system or for file system namespace. The number of streams may be different depending on the type of data blocks. For example, the file system manager 208 may be able to create no more than 100 streams for user data and no more than 64 streams for file system namespace.

The numbers of streams may be configured and adjusted base on client's requirement and system performance of the deduplicating storage system. The creation of streams may be through a command issued to file system manager 208, such as openstream ( ) with disks to be taken specified. The creation of streams may be based on a request of client(s) 214. It may be also done at the initiation of the deduplicating storage system. Each stream is identified with an identifier (ID). As illustrated, there are N streams created and streams are identified as streams 1, 2, and N at references 122, 124, and 126 respectively. These N streams are dedicated for file system namespaces, and the file system namespace of each file system is assigned to one dedicated stream of the N streams. The file system manager 208 creates separate streams dedicated to data files of these file systems. Thus, each created stream is for one type of data block and one particular file system. The streams are for preserving locality of data access of data blocks, thus no intermingling of data blocks of different type or different file systems is allowed.

At task box 2, block manager 252 maps stream identifiers to the type of data blocks passing through the respective streams. Each data block is mapped to the stream identifier of the stream that the data block passes through. Thus, each data block passing through the number of streams has a stream identifier associated with it. In one embodiment, block manager 252 keeps track of the mapping through a block map 352. With block manager 252, a data block writing to storage units 210 may be tagged with a stream identifier of the created stream so that the data block may be identified with the particular stream of the file system manager, differentiating from other data blocks adjacently stored in the storage units. Since the data blocks are associated with the created streams, the reading of a data block may be through the particular stream that it is identified with. Thus, the writing to and reading from storage units follow the same stream for a particular data block.

At task box 3, content store 204 is accessed through a smaller number of streams dedicated to the type of data blocks in the deduplicating storage system for accessing the type of data blocks. As discussed herein above, a deduplicating storage system typically has a set of streams dedicated for accessing storage units. The number of streams varies depending on the characteristics of the deduplicating storage system. For the content store of a deduplicating storage system, it is typically preconfigured with the number of streams for access, and each data type is preconfigured with a certain number of streams. In this example, M (N>M) streams are dedicated for the file system namespaces.

The data blocks are accessed through the M streams, even though they come from different, larger number of file systems (N file system namespaces of N file systems) according to one embodiment of the invention. The mapping of the created N streams at reference 380 to the dedicated M streams at reference 382 is preconfigured in one embodiment of the invention.

For example, N=12 streams may be created for the file system namespaces of the deduplicating storage system 200, yet only M=3 streams are provided for the file system namespaces to be dedicated to access to the content store. The deduplicating storage system may cause streams 1-4 from the file system manager to access stream 1 to the content store; streams 5-8 from the file system manager to access stream 2 to the content store; and streams 9-12 from the file system manager to access stream 3 to the content store. Thus a larger number of streams are multiplexed to access a smaller number of streams for data block access. The multiplexing ratio (or referred to as the concentration ratio) in this example is 4. A different multiplexing ratio may be utilized depending on configuration of the deduplicating storage system.

With the multiplexing and the block map, data blocks are accessed through a smaller number of dedicated streams to the content store, yet the locality of the data blocks may be preserved in the storage units as the locality of the data blocks are tracked by the block map so the data blocks may be accessed based on the created larger number of streams from the file system manager. Thus, the multiplexing of the embodiments of the invention provides a virtual scale of streams over and above the dedicated streams to the content store of the deduplicating storage system, and it provides the created larger number of (virtual stream) for the file systems to access.

In one embodiment, a bit map 354 is utilized to track statuses of data blocks in the storage unit. The data blocks may be occupied or clean (occupied, or dirty, means valid data stored in a data block; clean means that the data block contains no valid data) in the storage units when new data are written into and read from the storage units. Bit map 354 tracks dynamically the data blocks being occupied or clean so the data can be written to clean data blocks in the storage units without impacting occupied data blocks.

Note block map 352 and bit map 354 are depicted in block manager 252 in this example. However, block map 352 and bit map 354 may be implemented as modules outside of block manager 252 or directory manager 222 but perform same or similar functions of tracking mapping and statuses of data blocks.

Figure 3B:
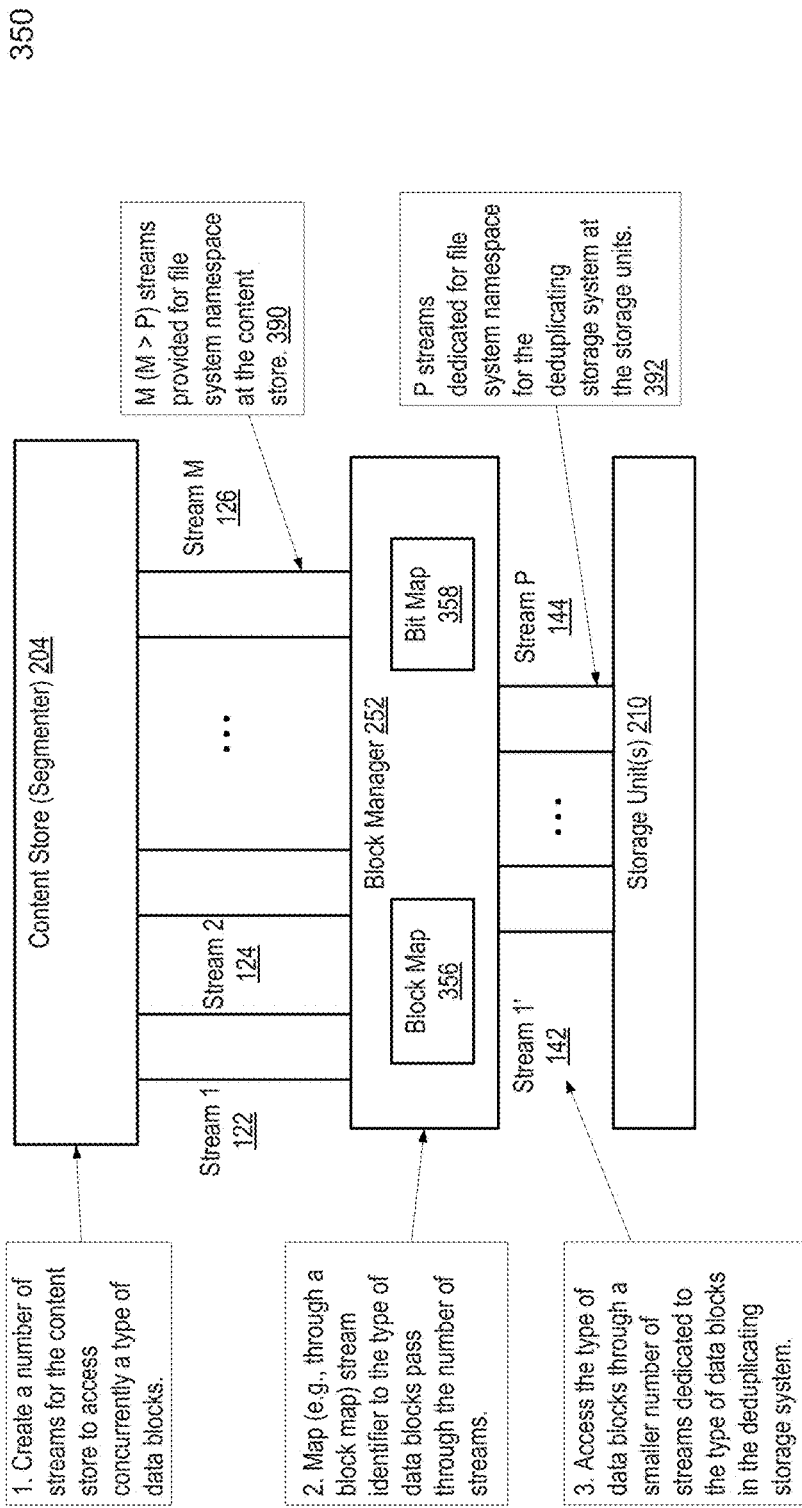
FIG. 3B is a block diagram illustrating storage unit access of a deduplicating storage system according to another embodiment of the invention

FIG. 3B is a block diagram illustrating storage unit access of a deduplicating storage system according to another embodiment of the invention. The deduplicating storage system 350 is similar to the duplicating storage system 300 in FIG. 3A, and the same or similar references indicate elements or components having the same or similar functionalities.

The dedicated streams for accessing data blocks may also be set in communication between a content store such as content store 204 and storage units of the deduplicating storage system such as storage units 210. The number of streams for content store 204 to access the storage units 210 may be determined by a variety of factors, such as the characteristics of storage unit interface 212 and the storage units. The multiplexing discussed in relation to FIG. 3A may be applied to the communications between content store 204 and storage units 210 as well.

Task boxes 1-3 illustrate a data access process through multiplexing a set of dedicated streams according to one embodiment of the invention. The operations of the task boxes are similar to the ones in the FIG. 3A, thus they are not repeated here. Block manager 252 may use different block map and bit map such as block map 356 and 358 respectively for tracking the data blocks. The multiplexing provides a virtual scale of streams over and above the dedicated streams to the storage units of the deduplicating storage system, and it provides the created larger number of (virtual streams) for the content store to access.

Implementation for File System Namespace

As discussed herein, embodiments of the invention apply to user data files and file system namespaces. For file system namespaces, as they are a particular type of metadata, additional consideration is required. File system namespace such as namespace 220, is managed by directory manager 222, and it is generally organized as a hierarchical data structure.

Figures 4A, 4B:
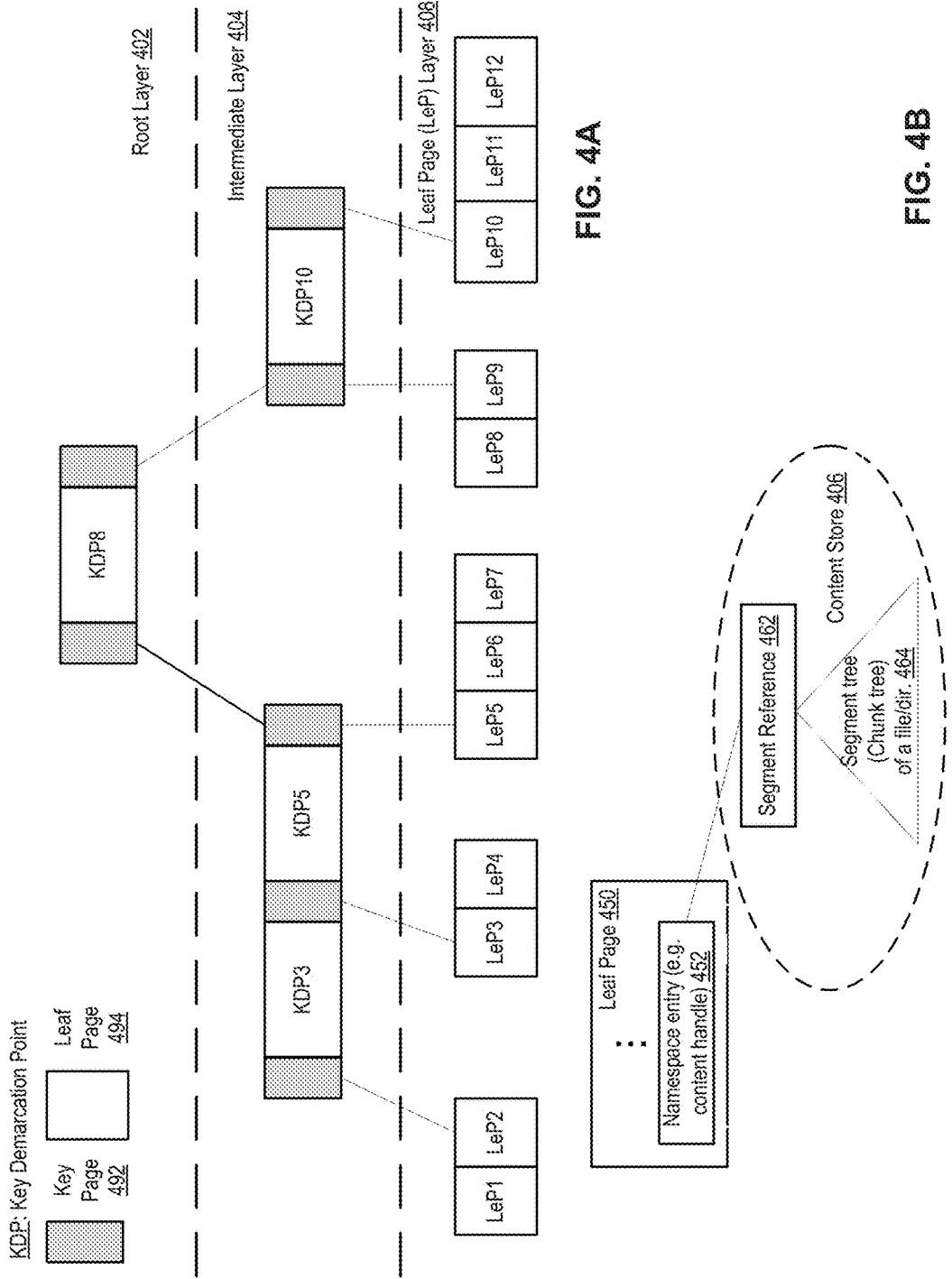
FIG. 4A illustrates a hierarchical data structure of a file system namespace according one embodiment of the invention.
FIG. 4B illustrates a namespace corresponding to data segments of a file system of a storage system according one embodiment of the invention.

FIG. 4A illustrates a hierarchical data structure of a file system namespace according one embodiment of the invention. The hierarchical layer contains a root layer 402, an intermediate layer 404, and a leaf page layer 408. Each layer contains one or more pages (also referred to as nodes), referred to as root pages, intermediate pages, and leaf pages respectively. While only one intermediate layer is illustrated in the figure, it is to be understood that the hierarchical data structure may contain multiple intermediate layers. In one embodiment, the hierarchical data structure is a B+ tree ("B" stands for Bayer, which was to honor the inventor Rudolf Bayer), although the principal disclosed in the embodiments of the invention may apply to other hierarchical data structure.

When the hierarchical data structure is a B+ tree, the intermediate pages are referred to as internal pages. The B+ tree stores namespace data at leaf pages. Root pages and intermediate pages contain key pages separated by key demarcation points. Each key page contains key entries represented by <key, data> pairs. The key of a <key, data> pair of the root page and internal page is formed by a computation including a parent Mode (index node) and a child Mode, and the data of the <key, data> pair of the root page and internal page points to a page of a lower level.

Within each key page, the key entries are sorted in order. The sorting may be performed through hash of the keys (e.g., producing 64 bits look_up keys for each of the <key, data> pairs). Through sorting, the keys with the same parent Mode are stored together in a key page. Each key page and leaf page are limited in size, thus key pages are separated by key demarcation points (KDPs), which indicates that all the keys with values less than the KDPs are stored at one side of the KDPs, and all the keys with value larger than the KDPs are stored at the other side of the KDPs. For each root node and internal node, there are n+1 key pages if there are n KDPs. KDPs may represent valid key value themselves.

At each leaf page, the <key, data> pair contains the key points to data, which points to a file or a directory of a file system of the storage system. For each file and directory, there are several keys contained in the B+ tree leaf page. One is Mode key (also known as a child key) that has the Mode as the data for the key. The Modes represent file system objects, such as files and directories of a file system of the storage system. Another is name key that has the file name as the data. Yet another is name hash key that has the hash value of the name as the data. The <key, data> pairs at the leaf page are generally referred to as the namespace entries.

FIG. 4B illustrates a namespace corresponding to data segments of a file system of a storage system according one embodiment of the invention. Namespace entries of the hierarchical data structure of a namespace correspond to file systems of a storage system. Leaf page 450 is illustrated as an example. Leaf page 450 contains a number of namespace entries such as namespace entry 452, each contains data corresponding to a file or directory of a file system. For example, the data may be a content handle. A content handle can uniquely identify a file or a directory in the file system. Content handle may contain Mode, parent inode, namespace identifier, and other information.

The content handle points to a segment reference 462, which corresponds to a segment tree of a file/directory 464. The segment reference 462 and segment tree (also known as chunk tree) 464 are within content store 406, which has been discussed herein above. Segment tree 464 contains chunks mapping to data segments of the file/directory. Thus, the hierarchical data structure of a namespace (stored in namespace 220 and interacting with directory manger 222 of FIG. 2) is different from the segment tree 464 (stored in content store 204 and interacting with file system manager 208 of FIG. 2), even though both are hierarchical data structures.

In a file system of a deduplicated storage system, a file may be represented in a tree having one or more levels of segments in a multi-level hierarchy. In one embodiment, there are seven levels L0 to L6, where L6 is the root level, also referred to as a top parent level representing one or more content handles. More or fewer levels may be applied herein. Each upper level contains one or more references to one or more lower level segments. In one embodiment, an upper level segment contains a fingerprint (e.g., metadata) of fingerprints of its child level segments. Only the lowest level segments are the actual data segments containing the actual deduplicated segments. Thus, L1 to L6 are segments only contain metadata of their respective child segments(s), referred to herein as LP segments.

In one embodiment, when accessing a file, a directory manager traverses the namespace represented by the hierarchical data structure described above until it reaches the leaf pages of the hierarchical data structure to obtain a content handle of the file. A container manager or content store manager (not shown) traverses the segment tree associated with the content handle identified by the directory manager, starting from the root level to leaf nodes. For example, the container manager obtains the fingerprints of the root level segments, in this example, L6 segments, as part of content handles. Based on the fingerprints of the current level segments, the container manager, which may be part of a content store manager, can identify which of the containers in which the segments are stored based on indexing information from the index (not shown). The index may be maintained in the system memory (e.g., volatile memory) and/or in a storage device (e.g., non-volatile memory). The index includes information mapping a fingerprint to a storage location that stores a segment represented by the fingerprint. In one embodiment, the index may be a fingerprint-to-container identifier (FP/CID) index that maps a particular fingerprint to a container that contains the corresponding segment or a compression region (CR) having the segment stored therein.

The metadata (e.g., fingerprints) and the data section of the current level segments can be obtained from the identified container. A container may contain metadata or fingerprints of all segments stored therein, where segments are compressed into a compression region. A segment can be obtained by retrieving the entire container or the corresponding compression region from the storage device or disk. Based on the metadata or the data section of a current level segment, its child segment or segments can be identified, and so on, until it reaches the leaf nodes representing the actual deduplicated segments. Throughout this application, for the purpose of illustration, a container contains one or more compression regions and each compression region contains one or more segments therein. However, the techniques may also be applied to other storage layouts.

Referring back to FIG. 4A, each leaf page contains namespace entries. Each leaf page is limited in size. In one embodiment, each leaf page is 64 kilo bytes (KB). Similar to key pages, the leaf pages are also sorted in order and the namespace entries within a leaf page are also sorted in order. The sorting may be performed through hash of the keys (e.g., producing 64 bits look_up keys for each of the <key, data> pairs). Through sorting, the namespace entries with the same parent Mode are stored together. Thus, the leaf pages 1 and 2 (denoted as LeP1 and LeP2 respectively) contain namespace entries pointed to from the same key page (the key page at the left of KDP3), and the namespace entries within LeP1 are all in orders higher than the namespace entries within LeP2. Similarly, the leaf pages 3 and 4 (denoted as LeP3 and LeP4 respectively) contain namespace entries pointed to from the same key page (the key page at the right of KDP3 and the left of KDP5), and the namespace entries within LeP3 are all in orders higher than the namespace entries within LeP4. However, the namespace entries within LeP3 are all in orders lower than the namespace entries within LeP1 and LeP2. In other words, all the namespace entries of the leaf pages of the leaf page layer 308 are ordered from the highest to the lowest according to their keys. The numbering of LeP and KDP in FIG. 4A with numerical orders indicates the orders of the leaf pages and key pages.

A benefit of B+ tree to store the namespaces of file systems of a storage system is efficient search time. For example, to search a data in one million <key, data> pairs, a balanced binary tree requires about 20 block reads, while a B+ tree requires only about 4 block reads.

Namespace entries and key page entries associated with file systems are updated during operations of the storage system. The updates are not in a predetermined order and depend on the nature of operations. For example, when a directory grows to contain a large number of files and then subsequently removes a substantial portion of the files, the operations generate leaf pages that are substantially full initially and then become sparse or even empty when the files are removed. When a leaf page becomes empty, it will be collected and reused.

For a file system namespace, the combination of the B+ tree and segment tree is referred to as a management tree (or Mtree). The Mtree is associated with a file system namespace, and each Mtree needs a dedicated stream from the file system manager to maintain locality of file system namespace as illustrated in FIG. 3.

With the hierarchical structures of the file system namespace, the block mapping may provide more information in aiding access to the storage units. FIG. 5 illustrates an implementation of block map for file system namespace according to one embodiment of the invention. The block map 352 is an implementation of the block map 352 in FIG. 3, and it contains multiple entries, and each entry is for one data block. All the referred data blocks are for file system namespace. While the data blocks are identified with numeric numbers in this example, other data block identifier (ID) may be implemented. Each data block maps to a file system namespace identifier indicating the file system namespace the data block belongs to. In addition, each block map entry indicates the page type of the corresponding data block. As illustrated, the page type may be one of summary page, root page, internal page, and leaf page. Root page, internal page, and leaf page are discussed herein above in relation to FIG. 4A. Summary page, when it is implemented, summarizes the hierarchical structure for a file system namespace, and it is stored at a large offset (e.g., 10 GB offset) away from the pages in the hierarchical structure for a file system namespace. Note pages for a particular file system namespace, which identified by file system namespace IDs, tend to be stored adjacently in the storage units of the deduplicating storage system to preserve locality. As the data blocks are read from and written to the storage units though, data blocks for the same file system namespace may be scattered, such as data blocks 112 and 113, which are the leaf pages of file system namespace 1, and which are separated from the rest of the pages of the same file system namespace. Block map 352 plays an important role to locate the data blocks for the same file system namespace through the dynamic process of accessing the storage units by the file systems.

Figures 6A, 6B:
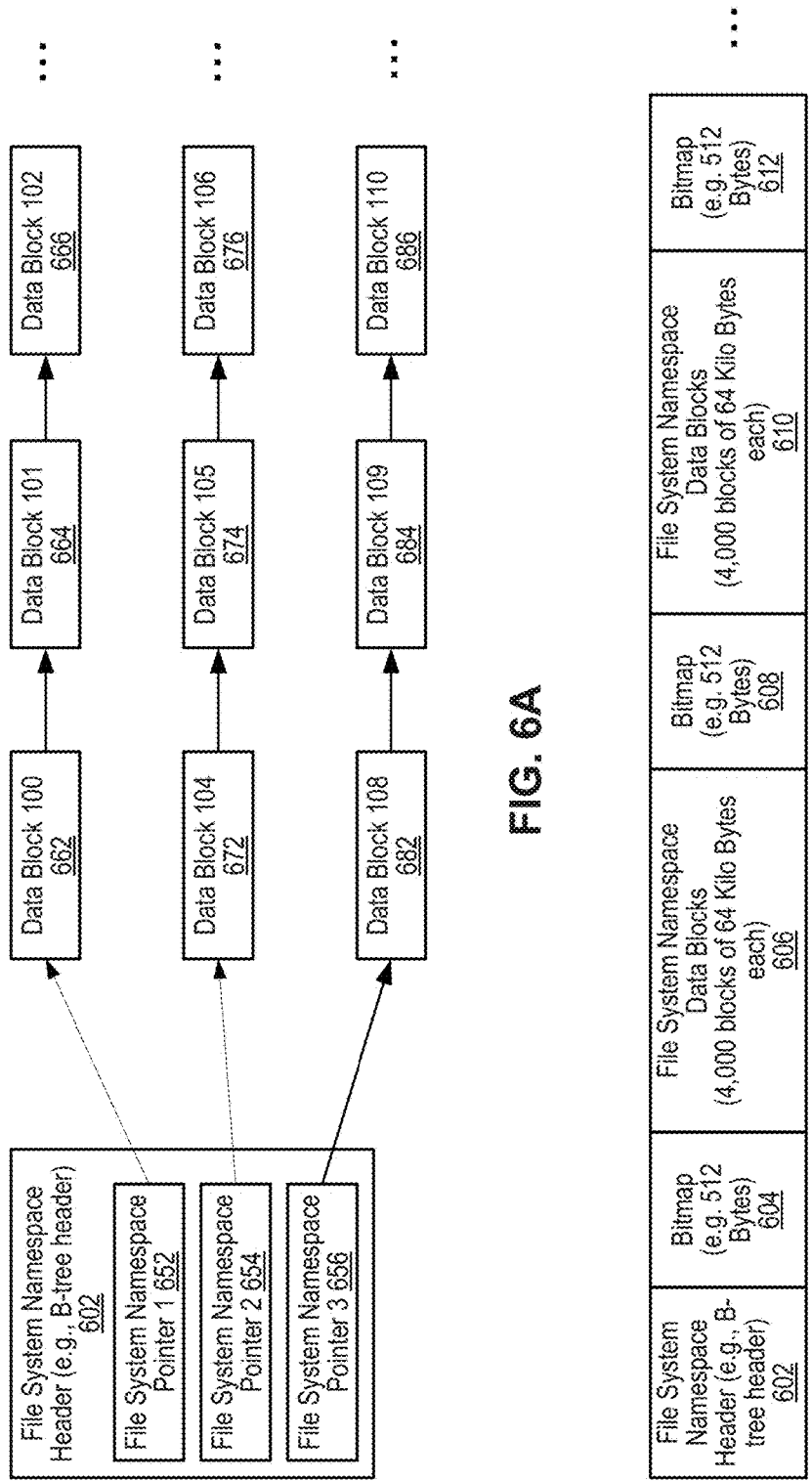
FIG. 6A illustrates accessing the data blocks of the file system namespaces according to one embodiment of the invention.
FIG. 6B illustrates an implementation of bitmap for file system namespace according to one embodiment of the invention.

FIG. 6A illustrates accessing the data blocks of the file system namespaces according to one embodiment of the invention. The access of the data blocks of the file system namespaces starts from a file system namespace header 602. File system namespace header 602 (e.g., B-tree header data blocks) is stored in storage units too in one embodiment, and it contains points to the data blocks of the summary pages of the file system namespaces. In this example, file system namespace 602 contains file system namespace pointers 1, 2, and 3 at references 652, 654, and 656 respectively for pointing to respective file system namespaces. In one embodiment, upon a request to access a data block of a file system namespace, the content store checks file system namespace header 602 to find the pointer to the summary page of the file system namespace. A file system namespace header includes the starting points of the file system namespaces. Based on the summary page, the content store finds the pointer to the root page, then following the hierarchical tree, it identifies the internal page, and then the leaf page containing the data block. These data blocks belonging to different file system namespaces may be stored adjacently, yet still maintain logical locality between data blocks of the same file system namespace, thanks to the tracking of stream identifiers in the block map, which is utilized by the file system namespace header for access.

FIG. 6B illustrates an implementation of bitmap for file system namespace according to one embodiment of the invention. File system namespace header 602 may contains pointers to a number of file system namespaces as discussed. The file system namespace data blocks may be stored in clusters of data blocks. In this example, 4,000 data blocks of 64 kilo bytes each are stored in a cluster. Each data block of 64 kilo bytes corresponds to a page in the B+ tree illustrated in FIG. 4A. A bitmap of 512 bytes=4096 bits corresponds to the cluster. In the bitmap, each bit indicates a corresponding data block is ether occupied or clean (e.g., a bit value one means the corresponding data block is occupied, or the data block is "dirty"; a bit value zero means the corresponding data block is clean and can be written to). When the content store finds a data block is clean, it may write to the data block with data from a particular file system. After the data from the particular file system namespace is written to the data block, the bitmap is updated to indicate the data block is occupied. In addition, the block map may be updated to indicate that the data block is written by the particular file system namespace, and optionally indicate the page type of the data block. With the bitmap, the advantage is that the relatively small size of bitmaps may be sufficient to indicate statuses of a large number of data blocks.

In FIG. 6B, the bitmaps are illustrated to separate clusters of data blocks of file system namespace. Thus, to find a clean data block in a cluster, the content store will just check the adjacent bitmap without going through a global search of all clusters. The bitmap may be stored separately in the storage units, as long as the mapping to the cluster of data blocks is known by the content store.

Snapshot Identifier Implementation

In a typical deduplicating storage system, a snapshot map is maintained to keep track of the data blocks being in different snapshots. FIG. 7A illustrates a snapshot map and corresponding data blocks. The snapshot map 702 contains multiple entries, each corresponding to one data block. Each snapshot map entry contains a data block identifier identifying a data block, and a snapshot ID (SID) indicating the SID of the latest snapshot. In this example, data blocks 1, 2, and 3 have the latest snapshot taken by snapshots 17, 19, and 20 respectively. The tracking of snapshot version is necessary to maintain the integrity of the data blocks. Thus as the deduplicating storage system periodically takes snapshot, snapshot map 702 is updated to indicate the SIDs of different data blocks. The snapshot map, as a snapshot record, is stored separately from the data blocks.

FIG. 7B illustrates updating a snapshot record according to one embodiment of the invention. Instead of maintaining a snapshot map separately from the data blocks, the snapshot record may be maintained within the data block. Thus, once a snapshot of a data block is taken, the snapshot identifier field within the data block is updated to indicate the snapshot ID. The inclusion of snapshot record within the data blocks make the tracking of data block status more efficient, along with the block map and bitmap discussed herein above.

A Flow Diagram

Figure 8:
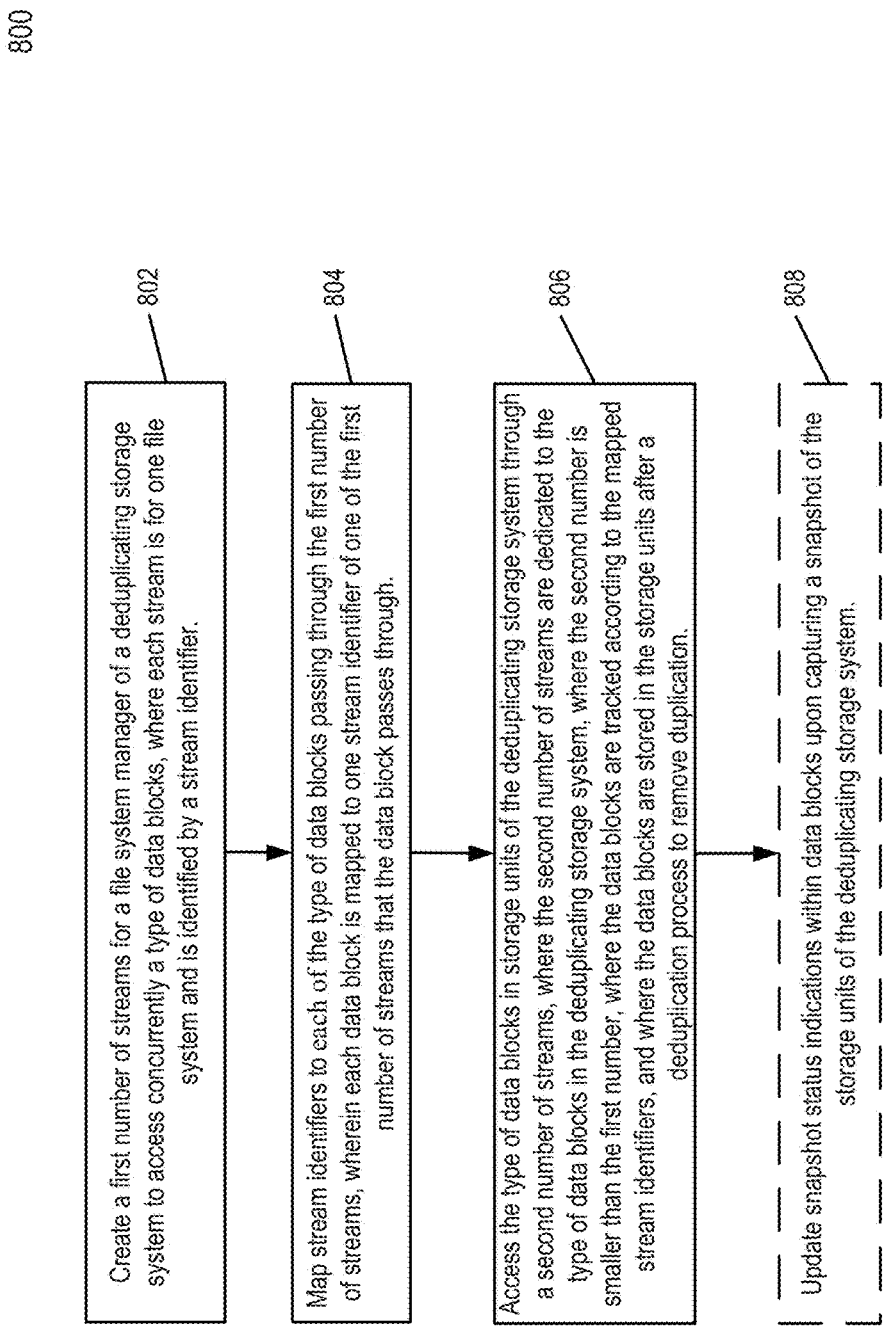
FIG. 8 is a flow diagram illustrating a method of stream multiplexing according to one embodiment of the invention.

FIG. 8 is a flow diagram illustrating a method of stream multiplexing according to one embodiment of the invention. Method 800 may be performed in a deduplicating storage system, and it may perform the operations by deduplicated storage engine 201, particularly block manager 252 as illustrated in FIG. 2 in one embodiment.

At reference 802, a first number of streams are created for a file system manager of a deduplicating storage system to access concurrently a type of data blocks. Each stream is for one file system and is identified by a stream identifier. Thus, each stream is dedicated to one file system, and no two file system would share a created stream by the file system manager.

The type of data blocks is the file system namespace of the file system in one embodiment. In that embodiment, data blocks of file system namespace are organized in a hierarchical data structure containing a layer of one root page, a layer of one or more intermediate pages, and a layer of a plurality of leaf pages. Each leaf page contains one or more data blocks and each data block containing a namespace entry corresponding to a file or a directory of a file system of the deduplicating storage system. In one embodiment, the hierarchical data structure is a B+ tree data structure, where each intermediate page is an internal page of the B+ tree, and each internal page is a parent page of one or more leaf pages. Note each file system namespace has one hierarchical data structure separated from hierarchical data structures from any other file system namespace.

At reference 804, each of the type of data blocks passing through the first number of streams are mapped to stream identifiers. Each data block is mapped to one stream identifier of one of the first number of streams that the data block passes through. The mapping is performed through a block map that maps each data block to a stream identifier. The block map additionally indicates a page type of each data block when the hierarchical data structure contains various type of pages in one embodiment. The page type includes at least one of a summary page, a root page, an intermediate page, and a leaf page.

At reference 806, through a second number of streams, the type of data blocks in storage units of the deduplicating storage system is accessed. The second number of streams are dedicated to the type of data blocks in the deduplicating storage system, and the second number is smaller than the first number. In addition, the data blocks are tracked according to the mapped stream identifiers, and the data blocks are stored in the storage units after a deduplication process to remove duplication.

Optionally at reference 808, snapshot status indications within data blocks are updated upon a snapshot of the storage units in which the data blocks are stored being captured. In one embodiment, each snapshot status indication is a snapshot identifier of the last taken snapshot.

Exemplary Storage System

Figure 9:
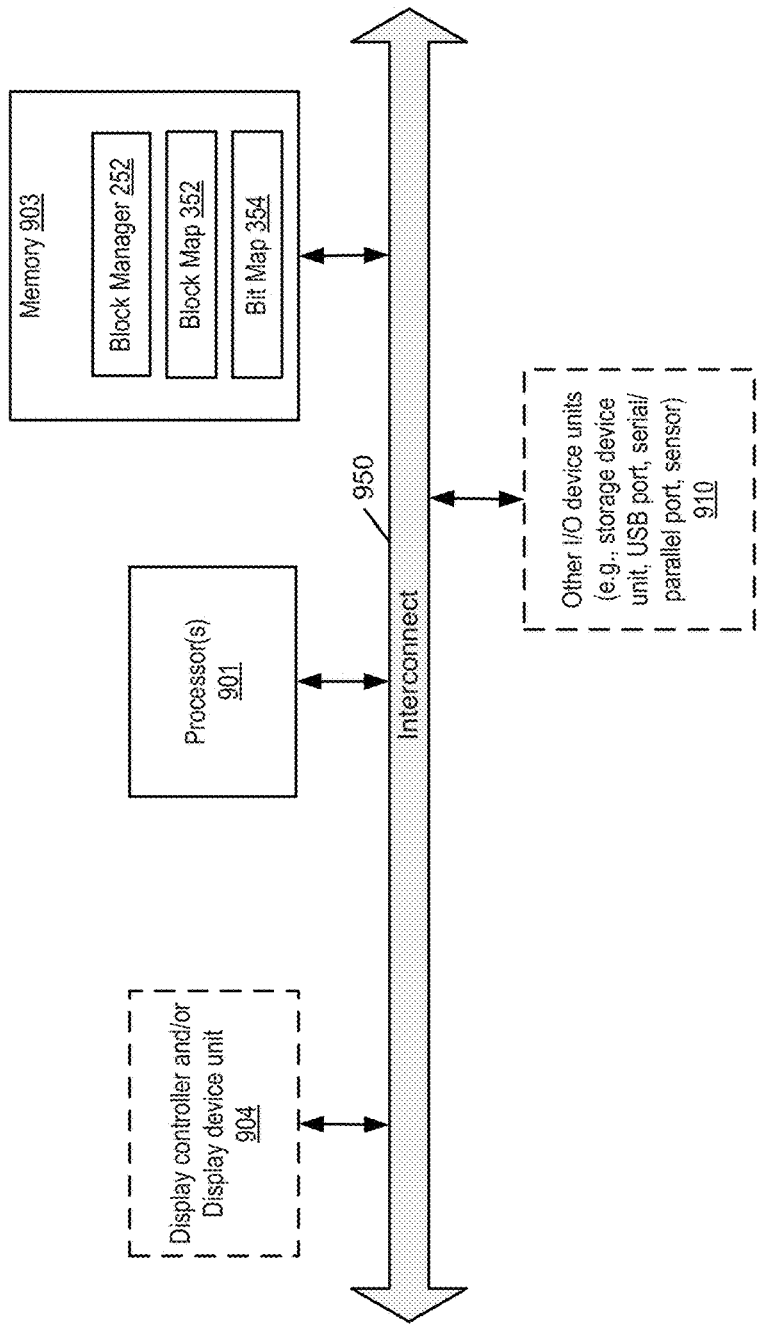
FIG. 9 is a block diagram illustrating a storage system that may be used with one embodiment of the invention.

FIG. 9 is a block diagram illustrating a storage system that may be used with one embodiment of the invention. For example, system 900 may represent any of the storage system described above performing any of the processes or methods described above. System 900 can include many different components, where optional components are illustrated with dotted boxes. These components can be implemented as integrated circuits (ICs), portions thereof, discrete electronic devices, or other modules adapted to a circuit board such as a motherboard or add-in card of a computing system, or as components otherwise incorporated within a chassis of the computing system. Note also that system 900 is intended to show a high level view of many components of the computing system. However, it is to be understood that additional components may be present in certain implementations and furthermore, different arrangement of the components shown may occur in other implementations.

In one embodiment, system 900 includes processor 901, memory 903, and device units 904-910 that are interconnected via a bus or an interconnect 950. Processor 901 may represent a single processor or multiple processors with a single processor core or multiple processor cores included therein. Processor 901 may represent one or more general-purpose processors such as a microprocessor, a central processing unit (CPU), or processing device. More particularly, processor 901 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 901 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 901 may communicate with memory 903, which in an embodiment can be implemented via multiple memory devices to provide for a given amount of system memory. As examples, the memory can be in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard to be referred to as LPDDR3 that will offer extensions to LPDDR2 to increase bandwidth. As examples, 2/4/8 gigabytes (GB) of system memory may be present and can be coupled to processor 901 via one or more memory interconnects. In various implementations the individual memory devices can be of different package types such as single die package (SDP), dual die package (DDP) or quad die package (QDP). These devices can in some embodiments be directly soldered onto a motherboard to provide a lower profile solution, while in other embodiments the devices can be configured as one or more memory modules that in turn can couple to the motherboard by a given connector.

Memory 903 may include one or more volatile storage (or memory) devices such as random access memory (RAM), dynamic RAM (DRAM), synchronous DRAM (SDRAM), static RAM (SRAM), or other types of storage devices. Memory 903 may store information including sequences of instructions that are executed by processor 901, or any other device units. For example, executable code and/or data of a variety of operating systems, device drivers, firmware (e.g., input output basic system or BIOS), and/or applications can be loaded in memory 903 and executed by processor 901. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

To provide for persistent storage of information such as data, applications, one or more operating systems and so forth, a mass storage (not shown) may also couple to processor 901. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 901, e.g., via a serial peripheral interface (SPI). This flash device may provide for non-volatile storage of system software, including a basic input/output software (BIOS) as well as other firmware of the system.

In one embodiment, processor 901 of system 900 is configured to execute data and instructions stored in memory 903. The data and instructions include block manager 252, block map 352, and bitmap 354.

In one embodiment, block manager 252 performs operations discussed in references to FIGS. 3 and 8.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method, comprising:
creating a first number of streams for a file system manager of a deduplicating storage system to access concurrently a type of data blocks, wherein each stream is for one file system and is identified by an identifier;
mapping stream identifiers to each of the type of data blocks passing through the first number of streams, wherein each data block is mapped to one stream identifier of one of the first number of streams that the data block passes through; and
accessing the type of data blocks in storage units of the deduplicating storage system through a second number of streams, wherein the second number of streams are preconfigured and dedicated to the type of data blocks for access in the deduplicating storage system, wherein the second number of streams is smaller than the first number of streams, wherein the data blocks are tracked according to the mapped stream identifiers, wherein the data blocks are stored in the storage units after a deduplication process to remove duplication, wherein the type of data block is file system namespace of the file system, wherein the data blocks of file system namespace are organized in a hierarchical data structure containing a layer of one root page, a layer of one or more intermediate pages, and a layer of a plurality of leaf pages, and wherein each leaf page contains one or more data blocks and each data block containing a namespace entry corresponding to a file or a directory of a file system of the deduplicating storage system.

2. The method of claim 1, wherein mapping the stream identifiers is performed through a block map that maps each data block to one stream identifier.

3. The method of claim 1, wherein the accessing the type of data blocks in storage units causes updating a bit map indicating a data block being occupied or not.

4. The method of claim 1, further comprising:
updating snapshot status indications within the data blocks upon capturing a snapshot of the storage units of the deduplicating storage system.

5. The method of claim 1, wherein the hierarchical data structure is a B+ tree data structure, and each intermediate page is an internal page of the B+ tree, and each internal page is a parent page of one or more leaf pages.

6. The method of claim 1, wherein the tracking of the data blocks include indicating a page type of each data block, wherein the page type includes at least one of a summary page, a root page, an intermediate page, and a leaf page.

7. A deduplicating storage system, comprising:

a processor and a non-transitory computer readable storage medium coupled to the processor, the non-transitory machine-readable storage medium containing instructions executable by the processor, wherein the deduplicating storage system is operative to:
  create a first number of streams for a file system manager of the deduplicating storage system to access concurrently a type of data blocks, wherein each stream is for one file system and is identified by an identifier;
  map stream identifiers to each of the type of data blocks passing through the first number of streams, wherein each data block is mapped to one stream identifier of one of the first number of streams that the data block passes through; and
  access the type of data blocks in storage units of the deduplicating storage system through a second number of streams, wherein the second number of streams are preconfigured and dedicated to the type of data blocks for access in the deduplicating storage system, wherein the second number of streams is smaller than the first number of streams, wherein the data blocks are tracked according to the mapped stream identifiers, wherein the data blocks are stored in the storage units after a deduplication process to remove duplication, wherein the type of data block is file system namespace of the file system, wherein the data blocks of file system namespace are organized in a hierarchical data structure containing a layer of one root page, a layer of one or more intermediate pages, and a layer of a plurality of leaf pages, and wherein each leaf page contains one or more data blocks and each data block containing a namespace entry corresponding to a file or a directory of a file system of the deduplicating storage system.

8. The deduplicating storage system of claim 7, wherein mapping of the stream identifiers to the type of data blocks is to be performed through a block map that maps each data block to one stream identifier.

9. The deduplicating storage system of claim 7, wherein the access of the type of data blocks in storage units is to cause updating a bit map indicating a data block being occupied or not.

10. The deduplicating storage system of claim 7, the deduplicating storage system is further to:
  update snapshot status indications within the data blocks upon capturing a snapshot of the storage units of the deduplicating storage system.

11. The deduplicating storage system of claim 7, wherein the hierarchical data structure is a B+ tree data structure, and each intermediate page is an internal page of the B+ tree, and each internal page is a parent page of one or more leaf pages.

12. The deduplicating storage system of claim 7, wherein the tracking of the data blocks include indicating a page type of each data block, wherein the page type includes at least one of a summary page, a root page, an intermediate page, and a leaf page.

13. A non-transitory computer-readable storage medium having instructions stored therein, which when executed by a processor, cause the processor to perform operations, the operations comprising:
  creating a first number of streams for a file system manager of a deduplicating storage system to access concurrently a type of data blocks, wherein each stream is for one file system and is identified by an identifier;
  mapping stream identifiers to each of the type of data blocks passing through the first number of streams, wherein each data block is mapped to one stream identifier of one of the first number of streams that the data block passes through; and
  accessing the type of data blocks in storage units of the deduplicating storage system through a second number of streams, wherein the second number of streams are preconfigured and dedicated to the type of data blocks for access in the deduplicating storage system, wherein the second number of streams is smaller than the first number of streams, wherein the data blocks are tracked according to the mapped stream identifiers, wherein the data blocks are stored in the storage units after a deduplication process to remove duplication, wherein the type of data block is file system namespace of the file system, wherein the data blocks of file system namespace are organized in a hierarchical data structure containing a layer of one root page, a layer of one or more intermediate pages, and a layer of a plurality of leaf pages, and wherein each leaf page contains one or more data blocks and each data block containing a namespace entry corresponding to a file or a directory of a file system of the deduplicating storage system.

14. The non-transitory computer-readable medium of claim 13, mapping the stream identifiers is performed through a block map that maps each data block to one stream identifier.

15. The non-transitory computer-readable medium of claim 13, wherein the accessing the type of data blocks in storage units causes updating a bit map indicating a data block being occupied or not.

16. The non-transitory computer-readable medium of claim 13, wherein the operations further comprise updating snapshot status indications within the data blocks upon capturing a snapshot of the storage units of the deduplicating storage system.

17. The non-transitory computer-readable medium of claim 13, wherein the hierarchical data structure is a B+ tree data structure, and each intermediate page is an internal page of the B+ tree, and each internal page is a parent page of one or more leaf pages.

18. The non-transitory computer-readable medium of claim 13, wherein the tracking of the data blocks include indicating a page type of each data block, wherein the page type includes at least one of a summary page, a root page, an intermediate page, and a leaf page.

* * * * *